United States Patent
Milligan et al.

(10) Patent No.: US 7,143,216 B1
(45) Date of Patent: *Nov. 28, 2006

(54) SYSTEM FOR CONFIGURING EXPANDABLE BUSES IN A MULTI-DEVICE STORAGE CONTAINER AND RELATED METHOD

(75) Inventors: Charles A. Milligan, Golden, CO (US); Philippe Y. Le Graverand, Saint Lys (FR)

(73) Assignee: Storage Technology Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/195,415

(22) Filed: Aug. 2, 2005

Related U.S. Application Data

(63) Continuation-in-part of application No. 10/444,660, filed on May 23, 2003, now Pat. No. 6,961,792.

(51) Int. Cl.
| | |
|---|---|
| *G06F 13/00* | (2006.01) |
| *G06F 13/14* | (2006.01) |
| *H03K 17/00* | (2006.01) |
| *H05K 7/02* | (2006.01) |
| *G06F 12/00* | (2006.01) |

(52) U.S. Cl. .................. 710/104; 710/51; 710/316; 709/253; 361/51

(58) Field of Classification Search .......... 710/200, 710/300, 306, 315, 316, 51, 31, 104, 313; 709/220, 221, 227, 253; 714/3; 370/351, 370/502, 916; 711/5, 100; 712/33; 361/683, 361/685, 729
See application file for complete search history.

(56) References Cited

U.S. PATENT DOCUMENTS

| | | | |
|---|---|---|---|
| 3,053,945 A | | 9/1962 | Harton et al. |
| 3,215,784 A | | 11/1965 | Williford |
| 3,611,317 A | | 10/1971 | Bonfeld |
| 4,744,103 A | * | 5/1988 | Dahlquist et al. ........... 379/247 |
| 5,053,918 A | | 10/1991 | Norden |
| 5,469,571 A | * | 11/1995 | Bunnell ...................... 718/103 |

(Continued)

OTHER PUBLICATIONS

"Disk arrays: high- performance, high-reliability storage subsystems" by Ganger et al. (abstract only)□□publication Date: Mar. 1994.*

(Continued)

*Primary Examiner*—Gopal C. Ray
(74) *Attorney, Agent, or Firm*—Brooks Kushman P.C.

(57) ABSTRACT

A system and method for configuring expandable buses wherein a host supports a plurality of expandable buses are provided. A plurality of devices are arranged to form a plurality of groups. Each group forms a chain of devices on an expandable bus. Each chain includes an input connector. The chains are configured such that connecting an expandable bus of the host to the input connector for a particular chain causes that particular chain to be directly connected to that particular expandable bus of the host. The absence of connecting any expandable bus of the host to the input connector for a particular chain causes that particular chain to be directly connected to a different chain so as to be indirectly connected to one of the expandable buses of the host. In another embodiment, the connections to an expandible bus of the host must be consistent with a predetermined connection logic.

14 Claims, 8 Drawing Sheets

U.S. PATENT DOCUMENTS

| | | | |
|---|---|---|---|
| 5,771,143 A * | 6/1998 | Vernois | 360/133 |
| 6,510,475 B1 | 1/2003 | Bennett | |
| 6,754,751 B1 | 6/2004 | Willke | |
| 6,804,747 B1 * | 10/2004 | McBrearty et al. | 711/114 |
| 6,961,792 B1 * | 11/2005 | Le Graverand | 710/104 |

OTHER PUBLICATIONS

"Improving the Execution of Groups of Simulations on a Cluster of Workstations and its Application to Storage Area Networks", IEEE XPLORE, Release 2.0, pp. 1-2.

* cited by examiner

SYSTEM FOR CONFIGURING EXPANDABLE BUSES IN A MULTI-DEVICE STORAGE CONTAINER AND RELATED METHOD

CROSS-REFERENCE TO RELATED APPLICATIONS

This application is a continuation-in-part of U.S. application Ser. No. 10/444,660 filed May 23, 2003, now U.S. Pat. No. 6,961,792 the entire disclosure of which is hereby incorporated by reference.

BACKGROUND OF THE INVENTION

1. Field of the Invention

The present invention relates to multi-device storage containers that have an internal expandable bus and to methods for configuring expandable buses.

2. Background Art

The use of expandable bus topologies has become widespread. For example, FireWire, USB and USB2 are well known expandable buses that are used today. In general, an expandable bus is any arrangement where a host supports a bus that may be expanded to allow the connection of multiple devices thereto. So, for example, SCSI and some other technologies such as arbitrated loop to a certain extent are also considered to be expandable buses. Typically, for any type of expandable bus there is a limit to the number of devices that may be placed on the same bus. For example, it is possible to put up to 63 devices on the same FireWire bus. Devices on the same bus share the same physical link such that the overall data throughput performance is limited by the bus type. In certain host implementations, the host may support more than a single bus.

When the host can support more than a single bus, it is useful to dispatch devices across all available buses. However, if the plurality of devices are encapsulated/gathered inside the same physical container, it could be difficult to arrange/modify the hardware bus topology among the plurality of devices in the container to adapt to the capabilities of the host. In the same way, the host could not adapt to a single container or set of containers. Further, the addition of a container to the host would desirably be hardware transparent to the greatest extent possible.

For the foregoing reasons, there is a need for an improved system for configuring expandable buses in a multi-device storage container and related method.

SUMMARY OF THE INVENTION

It is an object of the present invention to provide an improved system for configuring expandable buses in a multi-device storage container that configures the hardware bus topology among the plurality of devices in the container to adapt to the capabilities of the host, preferably, with minimal human intervention.

It is another object of the present invention to provide an improved system wherein multi-device storage containers are identical and interchangeable.

In carrying out the present invention, a system for configuring expandable buses wherein a host supports a plurality of expandable buses is provided. The system comprises a storage container containing a plurality of storage devices. The plurality of storage devices are arranged to form a plurality of groups. Each group forms a chain of storage devices on an expandable bus. The storage container further includes an input connector for each chain. The storage container and the chains are configured such that connecting an expandable bus of the host to the input connector for a particular chain causes that particular chain to be directly connected to that particular expandable bus of the host. Further, the storage container and the chains are configured such that the absence of connecting any expandable bus of the host to the input connector for a particular chain causes that particular chain to be directly connected to a different chain so as to be indirectly connected to one of the expandable buses of the host.

The storage container and storage devices may take a variety of forms such as a collection of drives in a drive enclosure with input connectors on the rear panel of the enclosure. There may be any number of predefined chains up to the number of storage devices present in the storage container. If no cable is connected to the associated input connector of any particular predefined chain, that chain is automatically linked to a different chain within the storage container. That is, if there is just one cable from the host (a single bus), all predefined device chains would be linked together and share the same bandwidth throughput. If there are multiple cable connections present from multiple buses of the host, the devices are dispatched accordingly onto the multiple buses. Preferably, the predefined chains are arranged as a sequence and any particular chain that does not have its own host connection is connected to the preceding chain.

At a more detailed level, the invention comprehends a plurality of configurable multiplexors and associated logic devices arranged such that for each chain a logic device causes that particular chain to be directly connected by a multiplexor to any expandable bus of the host presently connected to the associated input connector. Further, the logic device causes the particular chain to be directly connected to a different chain in the absence of any expandable bus presently connected to the associated input connector.

Further, in carrying out the present invention, a system for configuring expandable buses wherein a host supports a plurality of expandable buses is provided. The system comprises a plurality of devices arranged to form a plurality of groups. Each group forms a chain of devices on an expandable bus. Each chain includes an input connector. The chains are configured such that connecting an expandable bus of the host to the input connector for a particular chain causes that particular chain to be directly connected to that particular expandable bus of the host. The absence of connecting any expandable bus of the host to the input connector for a particular chain causes that particular chain to be directly connected to a different chain so as to be indirectly connected to one of the expandable buses of the host. In a further refinement, the system includes gating logic that requires that the connections set forth above be made in compliance with a predetermined connection logic.

Still further, in carrying out the present invention, a method for configuring expandable buses wherein a host supports a plurality of expandable buses is provided. A plurality of devices are arranged to form a plurality of groups. Each group forms a chain of devices on an expandable bus. Each chain includes an input connector. The method comprises, upon detecting the connecting of an expandable bus of the host to the input connector for a particular chain, directly connecting that particular chain to that particular expandable bus of the host. The method further comprises, in the absence of detecting the connecting of any expandable bus of the host to the input connector for a particular chain, directly connecting that particular chain to a different chain so as to be indirectly connected to one of the expandable buses of the host. In a further refinement, connection of a chain to an expandable bus of the host is further required to be compliant with a predetermined connection logic.

The advantages associated with embodiments of the present invention are numerous. Preferred systems and methods provide an auto-adaptable and configuration-free hardware platform.

The above objects and other objects, features, and advantages of the present invention are readily apparent from the following detailed description of the preferred embodiment when taken in connection with the accompanying drawings.

DETAILED DESCRIPTION OF THE PREFERRED EMBODIMENT

Figure 1A:
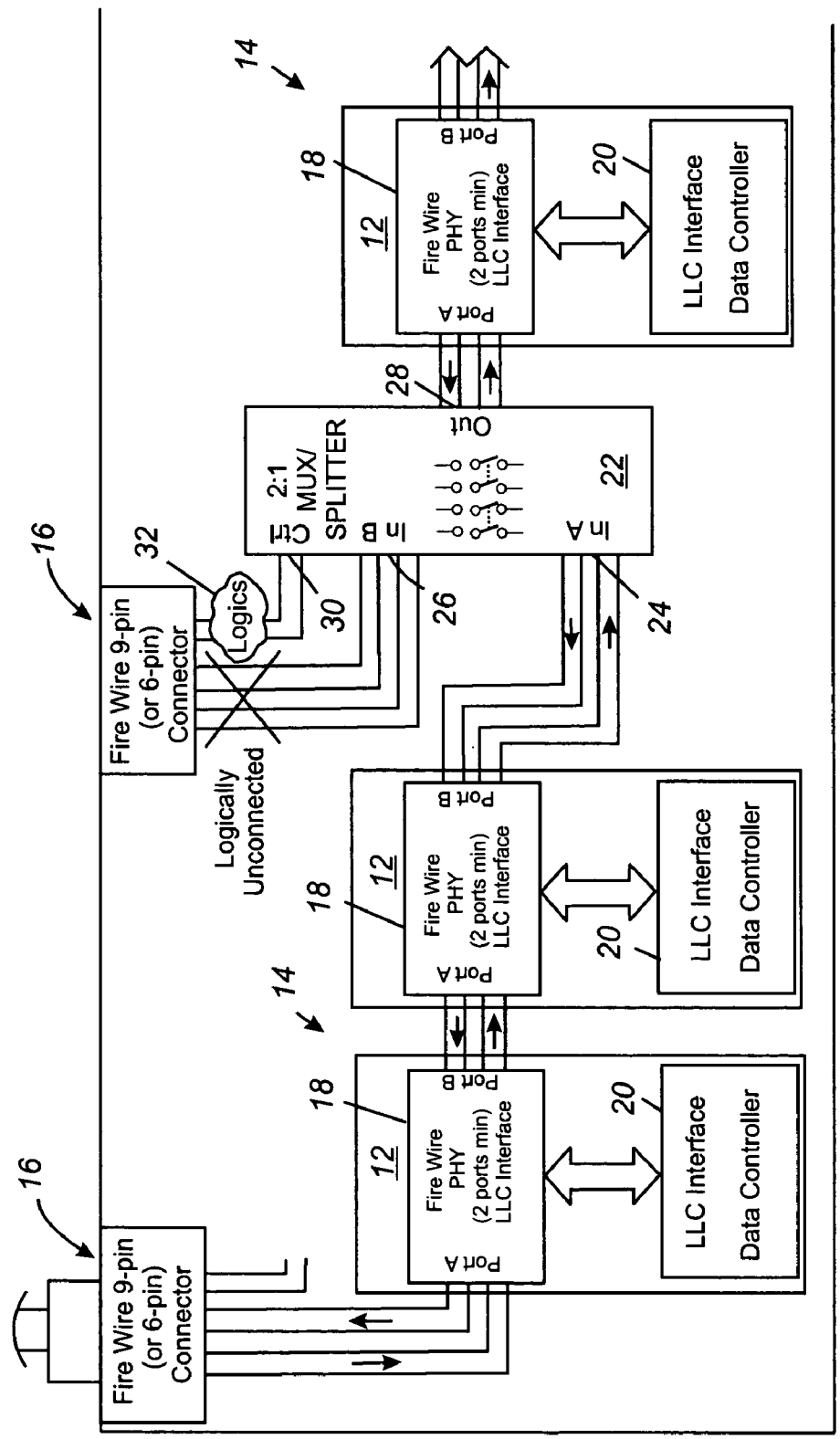
FIGS. 1A–1B is a diagram illustrating an exemplary embodiment of the present invention using FireWire where only the first FireWire cable is connected and all FireWire devices are on the same daisy chain.

FIGS. 1A–1B and 2A–2B illustrate an exemplary embodiment of the present invention that uses FireWire. Of course, embodiments of the invention may utilize any suitable expandable bus. A storage container 10 contains a plurality of storage devices 12. Of course, embodiments of the invention are not limited to storage devices or storage containers. Storage devices 12 are arranged to form a plurality of groups 14. Each group 14 forms a chain of storage devices 12 on an expandable bus of FireWire. Each chain has an associated input connector 16. As shown, the chains are arranged in a sequence with two FireWire devices per input connector 16. Of course, it is possible to put more or less FireWire devices on each input connector 16, and it is possible to put up to the standard FireWire limit of 63 devices on a potential chain.

Storage container 10 includes a plurality of configurable multiplexors 22 and associated logic devices 32. Each multiplexor 22 includes ports 24, 26, 28 and a selector 30. The multiplexors are 2:1 multiplexors such that it is possible to select which port, port 24 or port 26, is connected to port 28. In this exemplary embodiment, detection and self-configuration use the 2 power wires inside a FireWire carrying power cable, but such functionalities could be done via any other electronic or mechanical mechanism. When a cable is connected onto a connector 16, logic 32 configures the 2:1 multiplexor 22 to switch the communication path to the input connector 16 (port 26). When a cable is not detected at input connector 16, logic 32 configures the 2:1 multiplexor 22 to switch the communication path to the previous controller (port 24).

Each device 12 includes a FireWire physical layer controller 18 having two ports (minimum) and a logical link control layer interface. Each device further includes a data controller 20 having a logical link control layer interface to communicate with the FireWire physical layer 18.

Figure 1B:
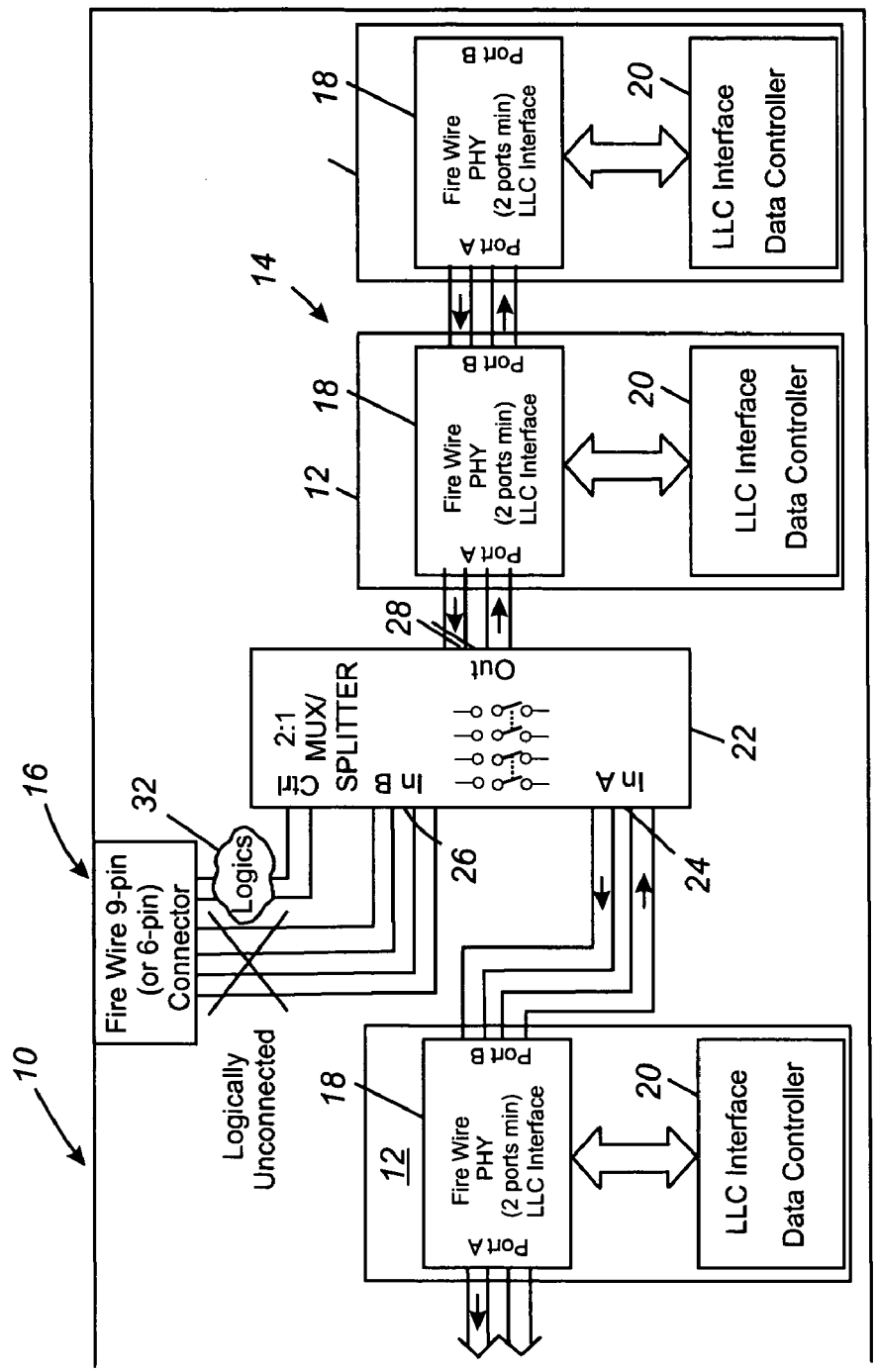
Figure 2A:
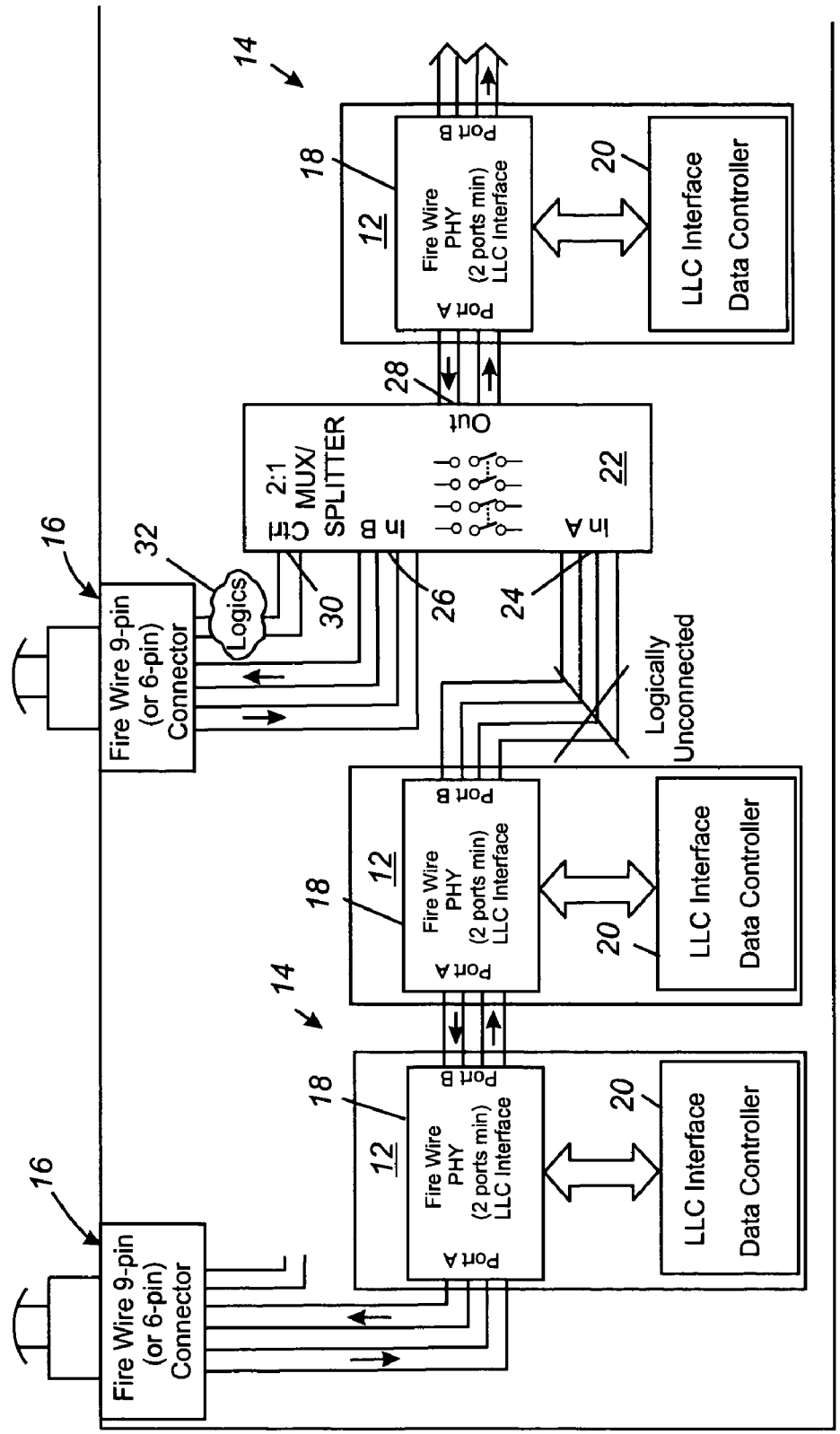
FIGS. 2A–2B is a diagram illustrating the exemplary embodiment with all the FireWire cables connected such that the FireWire devices are on several different daisy chains.
Figure 2B:
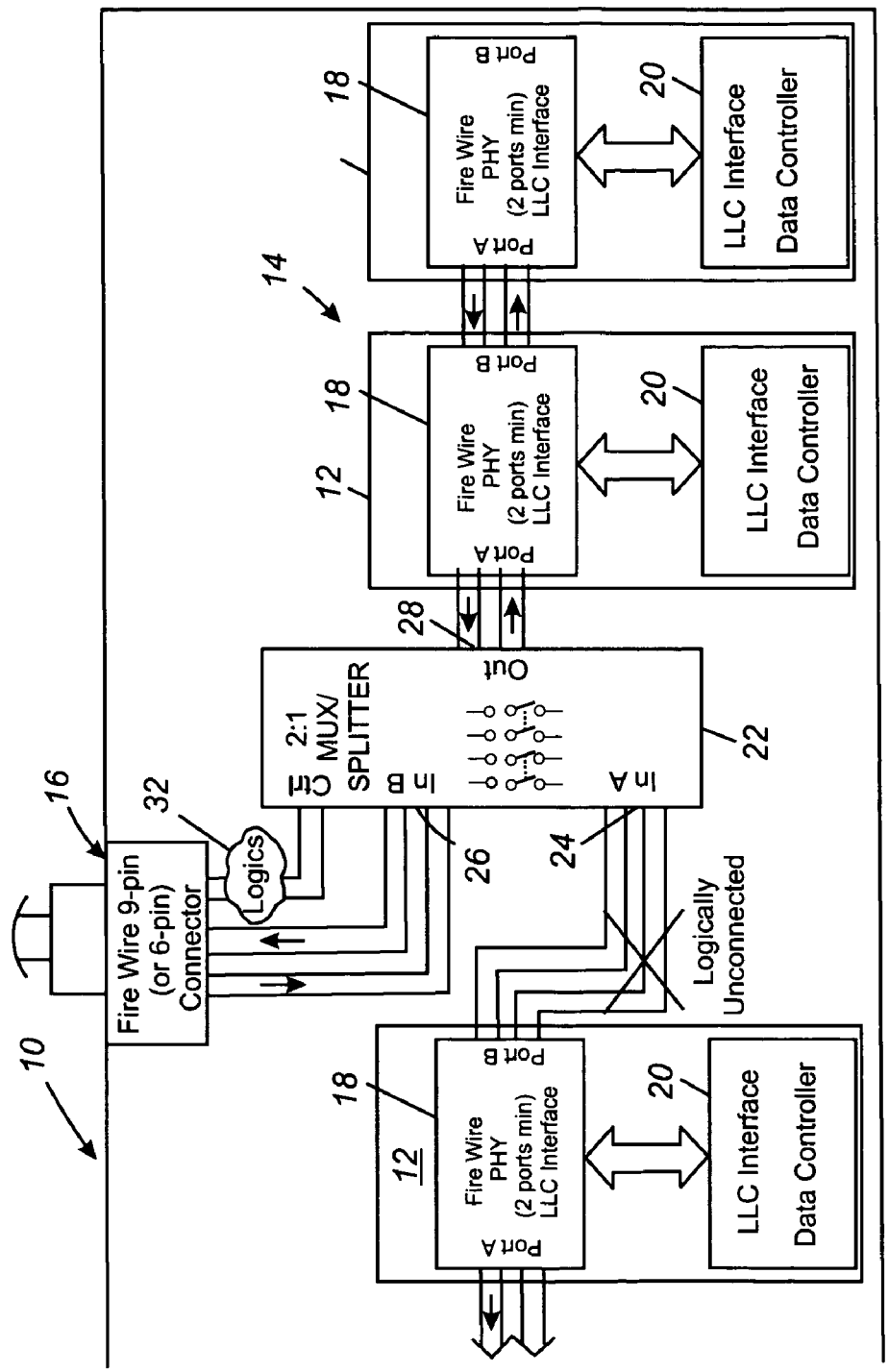

In FIGS. 1A–1B, only the first connector 16 receives a cable so all of the FireWire devices are on the same daisy chain. In FIGS. 2A–2B, all available connectors 16 receive a cable so the FireWire devices are dispatched on several independent daisy chains. Other potential cases are not shown in the drawings, but any configuration between these two cases is possible and supported in the example.

The FireWire implementation illustrated works for the several FireWire standard revisions provided that connectors and cables carrying power are used. In addition, although the FireWire devices are shown using a two-chip solution, a single chip solution having the FireWire physical layer interface embedded is possible. Lastly, although the use of FireWire has been discussed, any appropriate expandable bus may be used to implement embodiments of the present invention, as well as any types of devices.

Figure 3:
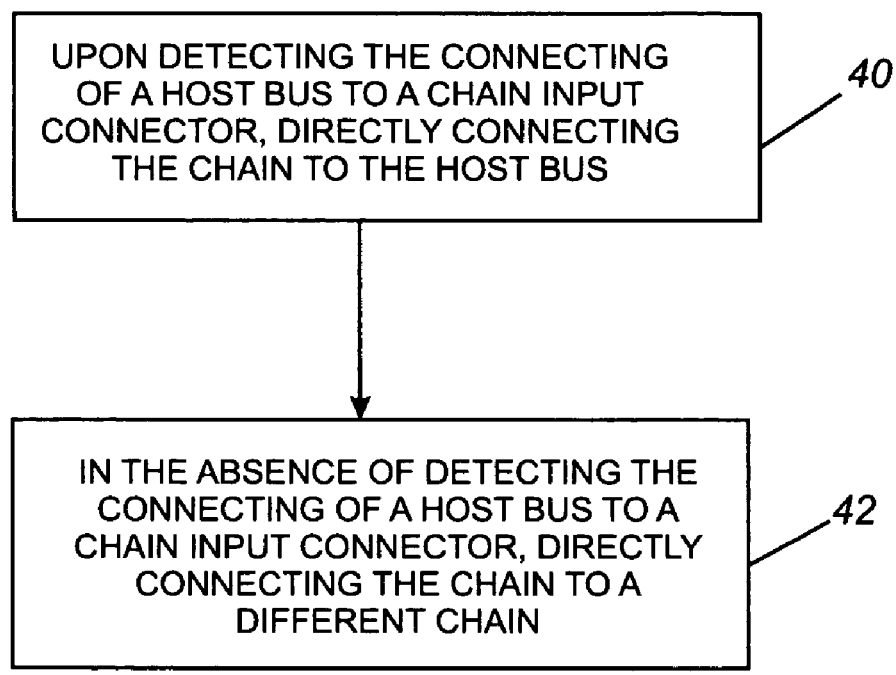
FIG. 3 is a flowchart illustrating a method of the present invention.

FIG. 3 illustrates a method for configuring expandable buses. At block 40, upon detecting the connecting of an expandable bus of the host to the input connector for a particular chain, that particular chain is directly connected to that particular expandable bus of the host. At block 42, in the absence of detecting the connecting of any expandable bus of the host to the input connector for a particular chain, that particular chain is directly connected to a different chain so as to be indirectly connected to one of the expandable buses of the host. Preferably, the chains are arranged in a sequence such that when a particular chain is directly connected to a different chain, the different chain is the preceding chain in the sequence of chains.

Figure 4A:
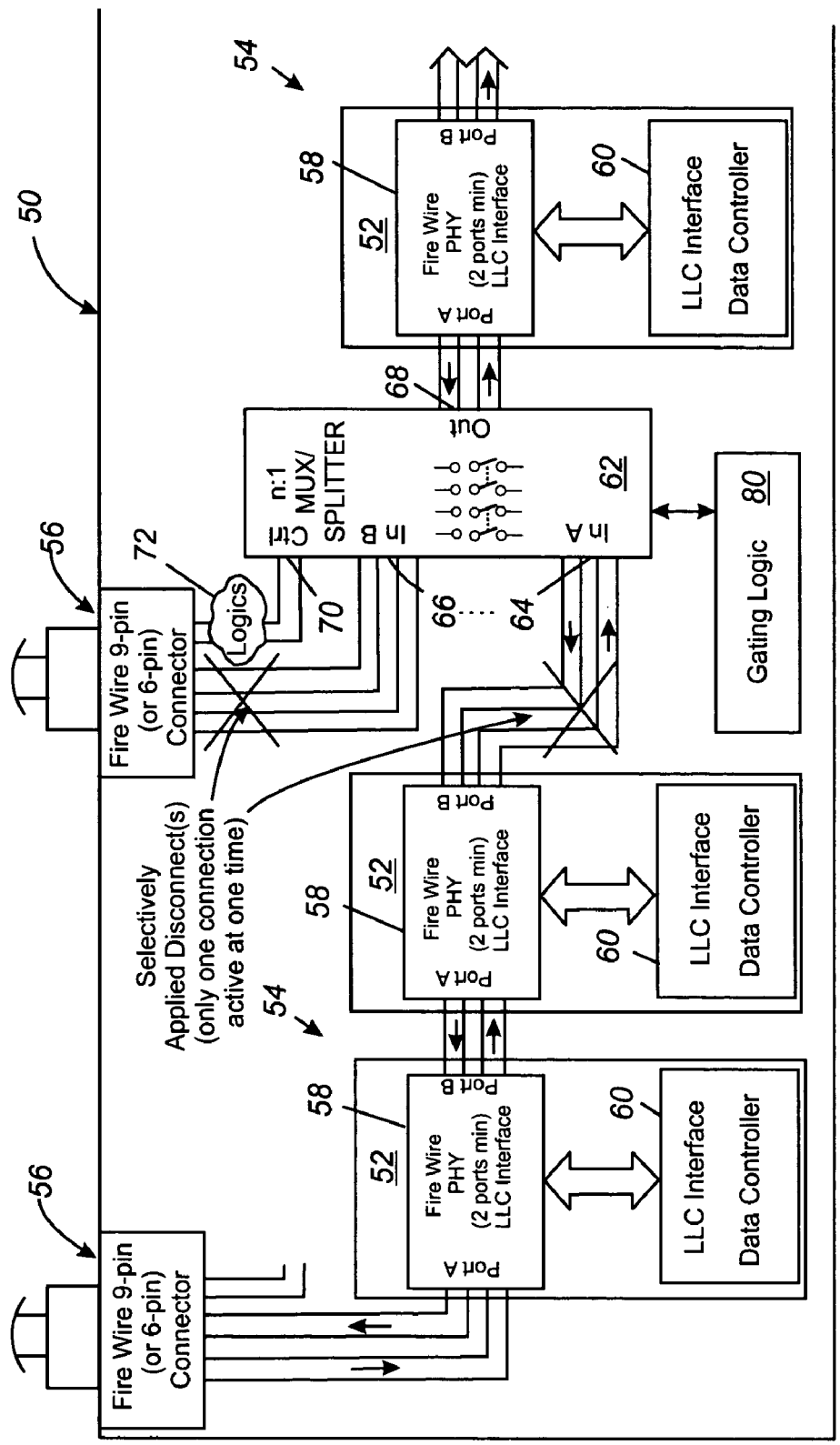
FIGS. 4A–4B is a diagram illustrating an exemplary embodiment which utilizes gating logic with all the FireWire cables connected such that the FireWire devices are on several different daisy chains.
Figure 4B:
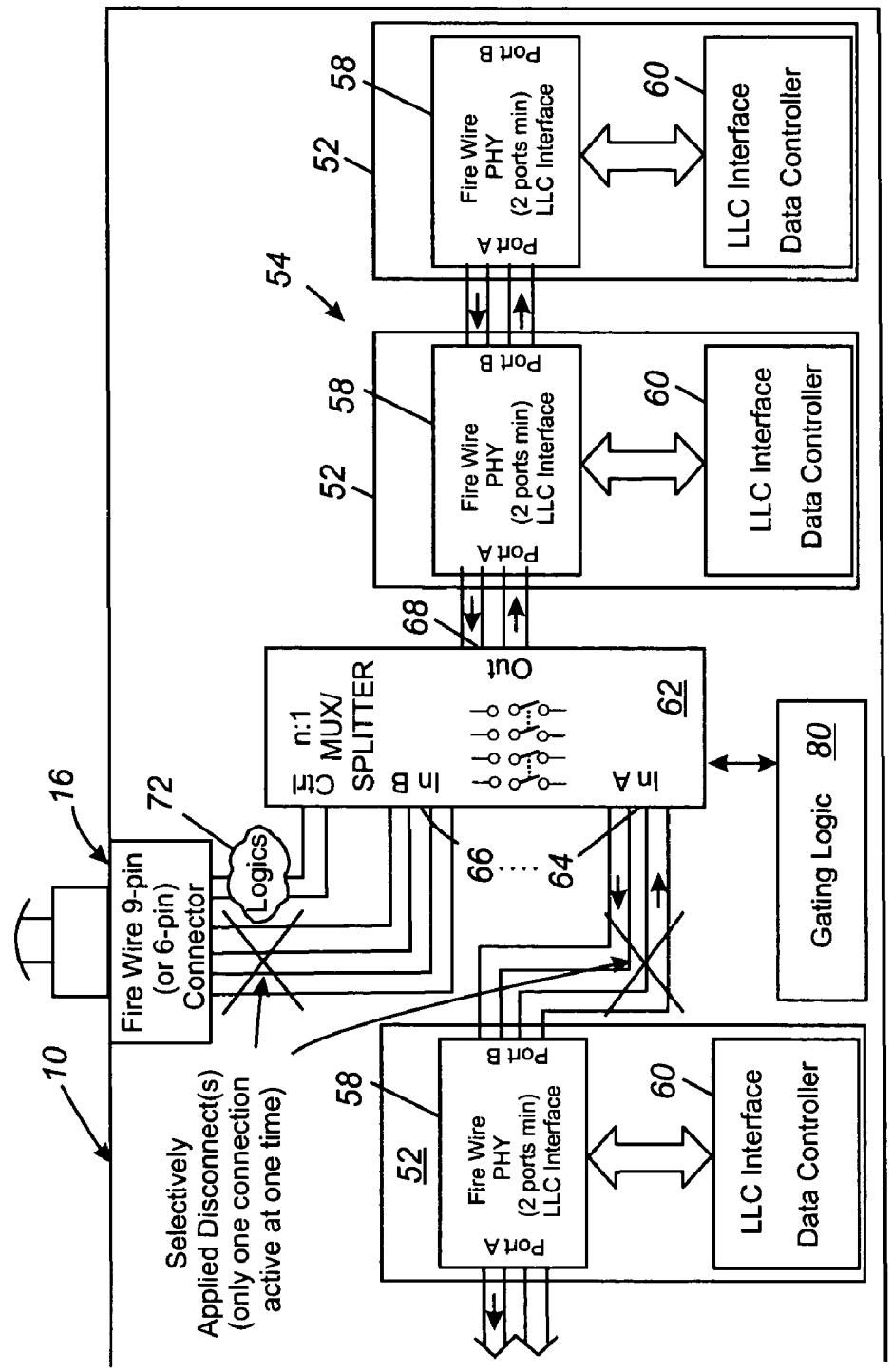

In another embodiment of the invention, gating logic is used to establish either a one or more direct connections to host or one or more indirect connections to other storage containers. FIGS. 4A–4B is a diagram illustrating an exemplary example of this embodiment which utilizes gating logic to determine a connection. For illustrative purposes, storage container 50 with all the FireWire cables connected such that the FireWire devices are on several different daisy chains. As set forth above, if only a single FireWire cable is attached, connection to the host is necessary through that cable. Storage container 50 contains one or more storage devices 52. Again, embodiments of the invention include any suitable device and are not limited to storage devices or storage containers. Storage devices 52 are arranged to form a plurality of groups 54. Each group 54 forms a chain of storage devices 52 on an expandable bus of FireWire. Each chain has an associated input connector 56. As shown, the chains are arranged in a sequence with two FireWire devices per input connector 56. Of course, it is possible to put more or less FireWire devices on each input connector 56, and it is possible to put up to the standard FireWire limit of 63 devices on a potential chain. Storage container 50 includes a plurality of configurable multiplexors 62 and associated logic devices 72. Each multiplexor 62 includes ports 64, 66, 68 and a selector 70. The multiplexors are n:1 multiplexors such that it is possible to select which port of n possible ports (this includes port 64 and port 66) is connected to port 68. Multiplexors 62 are also in communication with additional gating logic 80. Gating logic 80 utilizes or executes a predetermined connection logic that selects an expandible bus from a plurality expandible buses of the host to make connection with a particular chain of storage devices via ports 64, 66, 68. Specifically, a change in the inputs to gating logic 80 initiates a re-configuring of the gating controls in order to identify the appropriate connection for subsequent activity. These gating inputs include, for example, connection or disconnection of a bus extension (host or chaining to another canister), an interrupt message, or flag raised by triggering events, a specific request by control logic (e.g., driven by a customer engineer changing a configuration and requesting re configuration of the multiplexor logic).

Associated logic 72 is utilized in an analogous manner as above. However, in this embodiment, connection via associated logic 72 is conditional on the predetermined connection logic of gating logic 80. Storage multiplexors 62 and associated logic devices 72 are arranged such that for each chain a logic device causes that particular chain to be directly connected by a multiplexor to any expandable bus of the host presently connected to the associated input connector if connection thereof is compatible with the predetermined connection logic of gating logic 80. Moreover, that particular chain is directly connected to a different chain (e.g. the preceding chain in the sequence of chains), in the absence of any expandable bus presently connected to the associated input connector. When consistent with gating logic 80, detection and self-configuration use the 2 power wires inside a FireWire carrying power cable. It should also be appreciated that such functionalities can also be done via any other electronic or mechanical mechanism. When a cable is connected onto a connector 56, logic 72 configures the n:1 multiplexor 62 to switch the communication path to the input connector 56 (port 66) if such a connection is allowed by the predetermined connection logic of gating logic 80. In this embodiment, the n represents the number of potential connection paths. When a cable is not detected at input connector 56, logic 72 configures the n:1 multiplexor 62 to switch the communication path to the previous controller (port 64). Accordingly, the present embodiment is characterized in that a particular chain is directly connected to any expandable bus of the host presently connected to an input connector associated with the particular chain unless one or more predetermined conditions as determined by the predetermined connection logic of gating logic 70 are present. If such conditions are present, that particular chain is directly connected to a different chain. Examples of such predetermined conditions include, but are not limited to, determination of a storage device failure in a particular chain, determination that a particular connection is not available for immediate connection because of being in use or reserved, determination that a particular connection is not available for immediate connection because a pending operation [not yet started] has higher priority for use of the resource, determination that the data flow for the pending connection must be routed through a particular location, determination that a delay timer or other condition has been set for a particular connection that must be resolved before allowing further connections to take place, and combinations thereof. In another variation, the predetermined conditions are determined by reference to a priority list (i.e., a particular chain is connected to an expandable bus of the host in accordance with a priority list). Typically, a priority list is an ordered list of all potential connections. The first connection on the list is considered to be preferred and thereby implies highest priority. In some variations, a different list for each group of devices or even for each device is utilized. The list can be altered by events (e.g., changes in the workload or a particular device no longer being powered on), by external requests, or by algorithms such as a time slice algorithm that will allow time slice sharing independent of workload.

Still referring to FIGS. 4A–B, the architecture of storage container 50 is such that storage container 10 and the chains (groups 54) are configured with the chains arranged in a sequence such that when a particular chain is caused to be directly connected to a different chain, the different chain is the preceding chain. Although in this example the different chain is the preceding chain in the sequence of chains, the present embodiment embraces variations using more complex multiplexing schemes in which a given chain is able to be connected to any chain in storage container 50. These complex multiplexing schemes are symbolically represented by the dotted line connecting ports 64 and 66 which represents additional connection choices. Such connection choices include connections to one or more hosts and connections to one or more storage containers or other suitable canisters capable of inclusion on the expandible bus.

Figure 5:
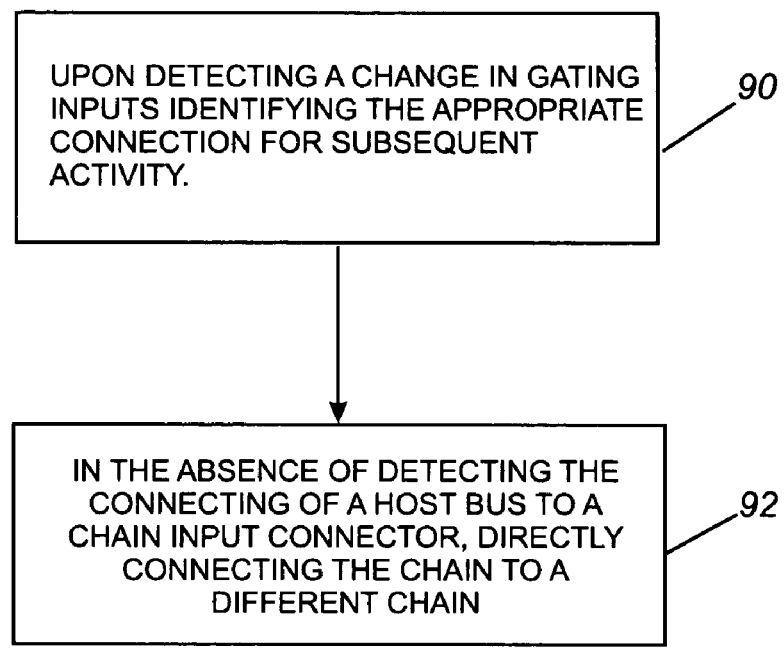
FIG. 5 is a method of the present invention.

FIG. 5 illustrates a method for configuring expandable buses used by the storage container of FIGS. 4A–B. At block 90, upon detecting a change in gating inputs (such as the inputs to gating logic 80 of FIGS. 4A–B) identifying an appropriate connection for subsequent activity. Such an appropriate connection is identified for the chains described above. For example, a particular chain is connected to a particular expandable bus of the host if connection thereof is compatible with a predetermined connection logic. The gating inputs include, for example, connection or disconnection of a bus extension (host or chaining to another canister), an interrupt message, or flag raised by triggering events, a specific request by control logic (e.g., driven by a customer engineer changing a configuration and requesting re configuration of the multiplexor logic). At block 92, in the absence of detecting the connecting of any expandable bus of the host to the input connector for a particular chain, that particular chain is directly connected to a different chain so as to be indirectly connected to one of the expandable buses of the host. Preferably, the chains are arranged in a sequence such that when a particular chain is directly connected to a different chain, the different chain is the preceding chain in the sequence of chains.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for configuring expandable buses wherein a host supports a plurality of expandable buses, the system comprising:
   a storage container including:
   a) a plurality of storage devices, the plurality of storage devices being arranged to form a plurality of groups, each group forming a chain of storage devices on an expandable bus,
   b) an input connector for each chain, and
   c) gating logic executing a predetermined connection logic that selects an expandable bus from a plurality of expandable buses of the host to make connection with a particular chain of storage devices.

2. The system of claim 1 wherein a particular chain is directly connected to any expandable bus of the host presently connected to an input connector associated with the particular chain unless one or more predetermined conditions as determined by the predetermined connection logic are present, if such one or more conditions are present, that particular chain is directly connected to a different chain.

3. The system of claim 2 wherein the one or more predetermined conditions include determination of a storage device failure in a particular chain, determination that a particular connection is not available for immediate connection because of being in use or reserved, determination that a particular connection is not available for immediate connection because a pending operation [not yet started] has higher priority for use of the resource, determination that the data flow for the pending connection must be routed through a particular location, determination that a delay timer or other condition has been set for a particular connection that must be resolved before allowing further connections to take place, and combinations thereof.

4. The system of claim 1 wherein a particular chain is connected to an expandable bus of the host in accordance with a priority list.

5. The system of claim 1 wherein a first expandable bus of the host is connected to a first input connector for a first chain and a second expandable bus is connected to a second input connector for a second chain such that the first chain is connected to the first expandable bus and the second chain is selectively connected to either the first expandable bus or the second expandable bus as determined by the predetermined connection logic.

6. The system of claim 1 wherein the storage container and the chains are configured with the chains arranged in a sequence such that when a particular chain is caused to be directly connected to a different chain, the different chain is the preceding chain in the sequence of chains.

7. The system of claim 1 wherein the storage container includes one or more of configurable multiplexors and associated logic devices arranged such that for each chain a logic device causes that particular chain to be directly connected by a multiplexor to any expandable bus of the host presently connected to the associated input connector if connection thereof is compatible with the predetermined connection logic, and causes that particular chain to be directly connected to a different chain in the absence of any expandable bus presently connected to the associated input connector.

8. The system of claim 7 wherein the storage container and the chains are configured with the chains arranged in a sequence such that when a particular chain is caused to be directly connected to a different chain, the different chain is the preceding chain in the sequence of chains.

9. A system for configuring expandable buses wherein a host supports a plurality of expandable buses, the system comprising:
a plurality of devices arranged to form a plurality of groups, each group forming a chain of devices on an expandable bus, each chain including an input connector, the chains being configured such that connecting an expandable bus of the host to the input connector for a particular chain causes that particular chain to be directly connected to that particular expandable bus of the host;
one or more configurable multiplexors; and
gating logic in communication with the one or more configurable multiplexors, the gating logic executing a predetermined connection logic that selects an expandable bus from a plurality of expandable buses of the host to make connection with a particular chain of storage devices, wherein the absence of connecting any expandable bus of the host to the input connector for a particular chain causes that particular chain to be directly connected to a different chain so as to be indirectly connected to one of the expandable buses of the host.

10. The system of claim 9 wherein the one or more configurable multiplexors include associated logic devices arranged such that for each chain a logic device causes that particular chain to be directly connected by a multiplexor to any expandable bus of the host presently connected to the associated input connector if connection thereof is compatible with the predetermined connection logic, and causes that particular chain to be directly connected to a different chain in the absence of any expandable bus presently connected to the associated input connector.

11. The system of claim 9 wherein the chains are arranged in a sequence such that when a particular chain is caused to be directly connected to a different chain, the different chain is the preceding chain in the sequence of chains.

12. The system of claim 11 wherein the chains are arranged in a sequence such that when a particular chain is caused to be directly connected to a different chain, the different chain is the preceding chain in the sequence of chains.

13. A method for configuring expandable buses wherein a host supports a plurality of expandable buses, and wherein a plurality of devices are arranged to form a plurality of groups, each group forming a chain of devices on an expandable bus, each chain including an input connector, the method comprising:
upon detecting a change in gating inputs identifying an appropriate connection for each chain, and
in the absence of detecting the connecting of any expandable bus of the host to the input connector for a particular chain, directly connecting that particular chain to a different chain so as to be indirectly connected to one of the expandable buses of the host.

14. The method of claim 13 wherein the chains are arranged in a sequence such that when a particular chain is directly connected to a different chain, the different chain is the preceding chain in the sequence of chains.

* * * * *